United States Patent [19]

Oyama et al.

[11] Patent Number: 4,580,471
[45] Date of Patent: Apr. 8, 1986

[54] MOTOR-INCORPORATED SPINDLE HEAD UNIT

[75] Inventors: Shigeaki Oyama, Hachioji; Kosei Nakamura, Hino; Yoshikazu Takano, Hino; Takashi Yoshida, Hino, all of Japan

[73] Assignee: Fanuc Limited, Hino, Japan

[21] Appl. No.: 494,328

[22] Filed: May 13, 1983

[30] Foreign Application Priority Data

May 17, 1982 [JP] Japan .................. 57-81584

[51] Int. Cl.⁴ ............................................. B23B 19/02
[52] U.S. Cl. ...................... 82/28 R; 82/30;
  82/DIG. 1; 310/90; 408/239 R; 409/135;
  409/232
[58] Field of Search .................. 82/28 R, 30, DIG. 1;
  408/239 R, 239 A; 409/232, 233, 135, 136;
  310/90

[56] References Cited

U.S. PATENT DOCUMENTS

| | | | |
|---|---|---|---|
| 806,048 | 11/1905 | Baggaley | 82/DIG. 1 |
| 2,055,651 | 9/1936 | Burrell | 82/DIG. 1 |
| 2,343,875 | 3/1944 | Schwartz | 409/135 |
| 2,725,775 | 12/1955 | Leifer | 82/28 R |
| 3,062,104 | 11/1962 | Deflandre | 82/30 |
| 3,701,911 | 10/1972 | Hauerback | 310/60 |
| 3,862,443 | 1/1975 | Edick | 310/57 |
| 4,133,230 | 1/1979 | Inaba et al. | 82/28 R |

FOREIGN PATENT DOCUMENTS 2500776  9/1982  France .................... 82/28 R

Primary Examiner—Francis S. Husar
Assistant Examiner—William E. Terrell
Attorney, Agent, or Firm—Armstrong, Nikaido, Marmelstein & Kubovcik

[57] ABSTRACT

A motor-incorporated spindle head unit is provided with a rotatable spindle on which a rotor assembly of the drive motor is fixedly mounted. A stator assembly of the drive motor is arranged around the rotor assembly and is fixed to a housing of the spindle head unit. A heat insulating system for preventing heat transfer from the stator assembly of the drive motor to the spindle as well as the bearings supporting the spindle is arranged between the drive motor and the front part of the spindle. The heat insulating system uses the flow of air for forming a heat insulator during the operation of the spindle head unit. A cooling system for cooling the stator assembly of the drive motor is also incorporated in the housing of the spindle head unit.

3 Claims, 3 Drawing Figures

MOTOR-INCORPORATED SPINDLE HEAD UNIT

BACKGROUND OF THE INVENTION

1. Field of the Invention

The present invention relates to a spindle head unit incorporating a spindle drive motor assembly, more particularly, to such a spindle head unit provided with a built-in heat insulation system between the spindle drive motor and the the spindle as well as the spindle support bearings.

2. Description of the Prior Art

Spindle head units incorporating drive motors, particularly, AC motors, for driving the spindles have come into wide use since they do not require rotation transmitting mechanisms and other auxiliary mechanisms between the spindles of the machine tools and the drive motors. The cutting tools or workpiece holders are attached to the noses of spindles. Such motor-incorporated spindle head units, however, suffer from inevitable generation of heat from the incorporated spindle motors due to the known copper and iron losses. The amount of heat generated increases with the power of the spindle motors and heats the spindle motors by an undesirably high extent, such as several dozen degrees centigrade. Heat transferred from the spindle drive motors to the spindles and to the bearings causes thermal deformation or expansion to the spindles and the bearings, resulting in inaccurate alignment of the spindles. Accordingly, the transfer of such heat has to be suppressed as much as possible.

To reduce this undesirable heat transfer to the spindles and spindle bearings, diverse cooling systems have been devised in conventional spindle head units so as to remove the heat from the spindle drive motors. For example, copending Japanese Patent Application Nos. 57-001006 and 57-001007 of the same applicant as the present application disclose improved cooling systems built in the spindle head units for effectively removing heat from the surfaces of the spindle drive motors. However, no method or arrangement has been adopted for providing effective heat insulation between spindle motors and the spindles and bearings.

SUMMARY OF THE INVENTION

An object of the present invention is therefore to provide a motor-incorporated spindle head unit with a heat insulating system effective for interrupting the heat transfer from the spindle drive motor to the spindle as well as the spindle support bearings.

Another object of the present invention is to provide a motor-incorporated spindle head unit having an internal structure capable of simultaneously achieving cooling of the spindle motor and interruption of heat transfer from the spindle motor to the front part of the spindle head unit.

In accordance with an aspect of the present invention, there is provided a motor-incorporated spindle head unit accommodating a heat insulating system arranged between a spindle support bearing unit adjacent to the spindle nose and the spindle drive motor. The heat insulating system comprises a fluid passage unit including a fluid inlet for introducing a fluid into the fluid passage unit, a fluid outlet arranged remotely from the fluid inlet for discharging the fluid to the atmosphere, and an annular passage for permitting the fluid to flow from the inlet toward the outlet around a part of the spindle adjacent to the spindle nose. The fluid is preferably air.

In accordance with another aspect of the present invention, the motor-incorporated spindle head unit comprises a cooling unit for cooling the stator assembly of the spindle motor by the use of cooling air.

BRIEF DESCRIPTION OF THE DRAWINGS

The present invention will be made more apparent from the ensuing description of an embodiment with reference to the accompanying drawings, wherein.

DESCRIPTION OF THE PREFERRED EMBODIMENT

Figure 1:
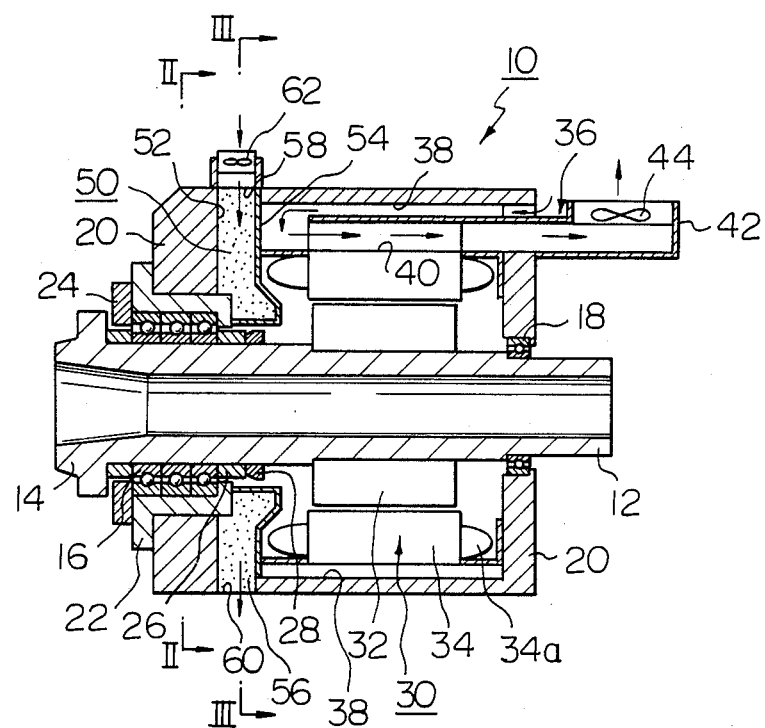
FIG. 1 is a longitudinal cross-section of a motor-incorporated spindle head unit according to an embodiment of the present invention.
Figure 2:
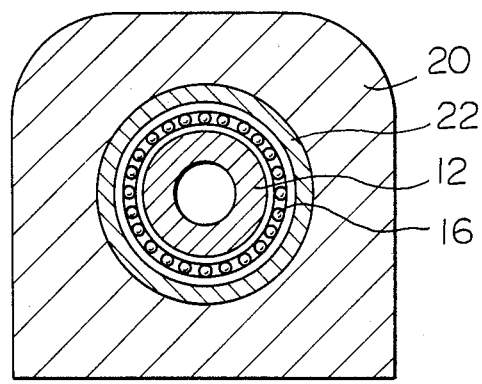
FIG. 2 is a cross-section taken along the line II—II of FIG. 1.
Figure 3:
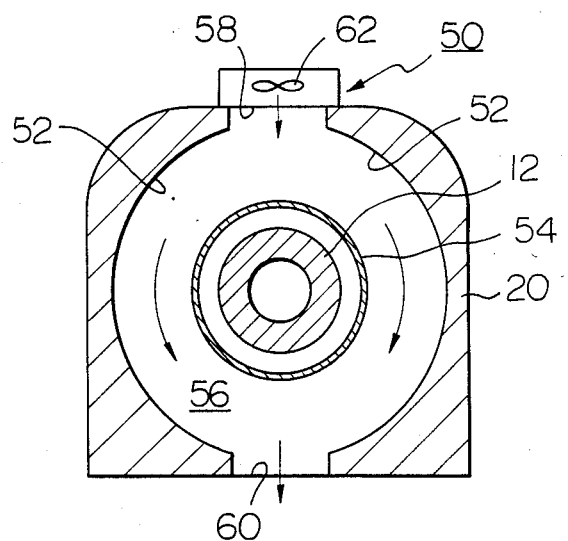
FIG. 3 is a cross-section taken along the line III—III of FIG. 1.

In FIGS. 1 through 3, a spindle head unit 10 includes a centrally disposed spindle 12 having axially front and rear end parts 14 and 15. The front end part 14 of the spindle 12 is formed as a spindle nose having a tapered bore in which a tool holder or a workpiece holder is received as required. The spindle 12 is rotatably supported by bearings 16 and 18 arranged at the front and rear end parts 14 and 15, respectively.

The front end part 14 is particularly supported by a plurality of bearings 16 so that it may stably hold the tool holder or the workpiece holder during the rotation of the spindle 12. Both the front bearings 16 and the rear bearings 18 are received in a housing 20. The front bearings 16 are mounted in the housing 20 through a flanged bush 22 and are restrained from axial movement by a suitable retaining member 24, a collar 26, and a nut 28 threadedly engaged with the spindle 12. The rear end part 15 of the spindle 12 is provided for mounting thereon a conventional rotation detector, such as a rotary tachometer, for detecting the rotary speed of the spindle 12.

The housing 20 has a mounting space and may be used for attaching the spindle head unit 10 on the body of a machine tool.

A rotor assembly 32 of a drive motor 30, i.e., an AC drive motor, is fixed to a substantially middle part of the spindle 12. That is, the rotor assembly 32 is rotatable with the spindle 12. A stator assembly 34 of the drive motor 30 is stationarily and coaxially arranged around the rotor assembly 32 with a small air gap remaining between both assemblies. The stator assembly 34 is secured to the housing 20 by a suitable fixing means, such as adhesives and screws. Thus, the drive motor 30 is incorporated in the mounting space of the housing 20 of the spindle head unit 10.

The rotary drive force of the rotor assembly 32 for rotating the spindle 12 generates when excitation windings 34a of the stator assembly 34 is supplied with electric current. The supply of electric current to the excitation windings 34a of the stator assembly 34 generates heat in the stator assembly 34 due to the iron and copper losses. Therefore, a cooling system 36 is interposed between the outer circumference of the stator assembly 34 and the housing 20 so as to cool the heated stator assembly 34.

The cooling system 36 is constituted so as to introduce external air from the rear end of the housing 20 into a cooling air passage 38 formed inside of the housing 20. The cooling air is first brought near to the front end part 14 of the spindle 12 through the cooling air passage 38 and then back to the rear end of the housing 20 through a return passage 40 formed within the stator core of the stator assembly 34. Subsequently, the cooling air, which has absorbed heat while passing through the cooling air passage 38 and the return passage 40, is discharged from a cooling air exhaust pipe 42. An exhaust fan 44 is arranged at the outer extremity of the cooling air exhaust pipe 42 so as to forcibly discharge the cooling air toward the atmosphere. The flow of the cooling air through the cooling system 36 is designated by arrows in FIG. 1. That is, the U-shaped cooling air circulation as shown in FIG. 1 contributes to the effective cooling of the stator assembly 34 of the spindle drive motor 30 due to the removal of heat by the flow of the cooling air.

In accordance with the present invention, a heat insulating system 50 is arranged between the front bearings 16 and the spindle drive motor 30. The heat insulating system 50 has an annular heat insulating passage 56 consisting of an annular bore 52 formed inside of a front part of the housing 20 and a sealing partition plate 54 made of a suitable heat nonconductive material disposed in front of the spindle drive motor 30.

The annular heat insulating passage 56 communicates with an air inlet 58 formed in the housing 20 and an air outlet 60 formed also in the housing 20. The air outlet 60 is located diametrically opposite to the air inlet 58. Air is introduced from the outside into the annular heat insulating passage 56 by an air supplying fan 62 disposed above the air inlet 58 and is discharged toward the outside through the air outlet 60. The thus formed heat insulator of flowing air between the front bearings 16 supporting the spindle 12 and the spindle drive motor 30 intercepts heat from the spindle drive motor 30 to the front bearings 16. Naturally, the air that flows through the annular heat insulating passage 56 also serves to remove heat from the spindle head unit 10. As described hereinbefore, although the spindle head unit 10 is formed in a compact and integral assembly of the spindle 12, the bearing units, and the incorporated spindle drive motor 30, the provision of the heat insulating system 50 between the bearing units and the spindle drive motor 30 intercepts the heat generated from the spindle drive motor 30 to the spindle 12 and the front bearing unit. Accordingly, the temperature of the front bearing unit is maintained within a practically fixed range at all times during operation and hence inaccurate alignment and other undesirable operation of the spindle 12 due to thermal expansion or thermal deformation are prevented. Therefore, a highly accurate machining operation is ensured by the use of the motor-incorporated spindle head unit. Further, the transfer of heat from the spindle drive motor 30 to the front bearings 16 as well as the spindle 12 can be avoided even if the amount of heat increases in response to an increase in the output power of the incorporated spindle drive motor.

We claim:

1. A motor-incorporated spindle head unit adapted to be mounted in a machine tool, comprising:
   a housing means provided as an outer framework of the unit and having therein a mounting space;
   a spindle extending centrally axially in said mounting space of said housing means and having front and rear end parts thereof, said front end part having a spindle nose to receive a tool or workpiece holder;
   a drive motor for said spindle, incorporated in said mounting space and including a rotor assembly rotatably fixed on said spindle and a stator assembly arranged to be fixed to said outer housing around said rotor assembly;
   a bearing means supporting said spindle at said front and rear end parts; and
   an annular insulating means for reducing heat transfer from said drive motor to said bearing means, including a fluid passage means arranged in said mounting space located between said stator assembly of said drive motor and said bearing means supporting said front end part of said spindle, said fluid passage means extending radially from adjacent said spindle to the outer circumference of said housing with a fluid inlet and a fluid outlet spaced remotely from said inlet, and said annular insulating means being enclosed by a partition plate member in said mounting space constituting a part of an inside wall of said housing means and being made of a heat insulating material.

2. A motor-incorporated spindle head unit as claimed in claim 1, and further comprising means on said housing for flowing a stream of cooling air into said annular insulating means so as to pass through said fluid passage means and discharge from said housing to the atmosphere.

3. A motor-incorporated spindle head unit as claimed in claim 1, and further comprising a second annular fluid passage opening into said housing means and passing in an axial direction adjacent said stator assembly, and means on said housing for flowing streams of air through both of said annular passages.

* * * * *